(12) United States Patent
McEwan et al.

(10) Patent No.: US 7,843,686 B2
(45) Date of Patent: *Nov. 30, 2010

(54) SYSTEM FOR PROTECTING A PORTABLE COMPUTING DEVICE

(75) Inventors: John Arthur McEwan, Alexandria, VA (US); James Stewart McEwan, Great Falls, VA (US)

(73) Assignee: Technology Advancement Group, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/041,292

(22) Filed: Mar. 3, 2008

(65) Prior Publication Data

US 2008/0310093 A1 Dec. 18, 2008

Related U.S. Application Data

(63) Continuation of application No. 11/038,421, filed on Jan. 21, 2005, now Pat. No. 7,339,783.

(51) Int. Cl.
*G06F 1/16* (2006.01)

(52) U.S. Cl. ............ 361/679.55; 206/320; 710/73

(58) Field of Classification Search ............ 361/679.55, 361/679.41; 206/320; 726/34; 710/73, 303
See application file for complete search history.

(56) References Cited

U.S. PATENT DOCUMENTS

| | | | |
|---|---|---|---|
| 5,002,184 A | 3/1991 | Lloyd | |
| 5,100,098 A * | 3/1992 | Hawkins | ............ 248/291.1 |
| 5,214,574 A | 5/1993 | Chang | |
| 5,242,056 A | 9/1993 | Zia et al. | |
| 5,267,123 A | 11/1993 | Boothroyd et al. | |
| 5,373,458 A | 12/1994 | Bishay et al. | |
| 5,586,002 A | 12/1996 | Notarianni | |
| 5,632,373 A | 5/1997 | Kumar et al. | |
| 5,648,762 A * | 7/1997 | Ichimura et al. | ............ 726/34 |
| 5,682,993 A | 11/1997 | Song | |
| 5,812,188 A | 9/1998 | Adair | |
| 5,835,344 A | 11/1998 | Alexander | |
| 5,931,297 A | 8/1999 | Weill et al. | |
| 6,145,661 A | 11/2000 | Jung | |
| 6,229,697 B1 | 5/2001 | Selker | |
| 6,257,407 B1 | 7/2001 | Truwit et al. | |
| 6,267,236 B1 | 7/2001 | Seok | |
| 6,269,948 B1 | 8/2001 | Jackson | |
| 6,273,252 B1 | 8/2001 | Mitchell | |
| 6,349,825 B1 | 2/2002 | Swinger et al. | |
| 6,356,440 B2 * | 3/2002 | Selker | ............ 361/679.55 |
| 6,359,777 B1 | 3/2002 | Newman et al. | |
| 6,362,954 B1 | 3/2002 | LeVander | |
| 6,442,018 B1 | 8/2002 | Dinkin | |
| 6,646,866 B2 | 11/2003 | Kao | |

(Continued)

*Primary Examiner*—Lisa Lea-Edmonds
(74) *Attorney, Agent, or Firm*—Nixon Peabody LLP; Marc W. Butler

(57) ABSTRACT

The invention relates to a system for protecting a portable computing device wherein the system comprises a device housing adapted to protectively encase a portable computing device, a protectively hardened user input device in communication with the device housing, and a protectively hardened display in communication with the device housing. When the portable computing device is encased within the device housing, a user of the portable computing device can operate the portable computing device via the protectively hardened user input device and the protectively hardened display. The device housing may further comprise sealing elements, insulating elements, and shock-absorbing elements.

22 Claims, 9 Drawing Sheets

U.S. PATENT DOCUMENTS

| | | |
|---|---|---|
| 6,654,235 B2 | 11/2003 | Imsand |
| 6,659,274 B2 | 12/2003 | Enners |
| 6,681,926 B2 | 1/2004 | DeVolpi |
| 6,896,134 B2 | 5/2005 | Russell et al. |
| 6,909,597 B2 | 6/2005 | Tutikawa |
| 6,967,836 B2 | 11/2005 | Huang et al. |
| 2002/0163778 A1 | 11/2002 | Hazzard et al. |
| 2003/0070948 A1 | 4/2003 | Barber et al. |
| 2003/0217940 A1 | 11/2003 | Russell et al. |
| 2005/0045505 A1 | 3/2005 | Vandevenne et al. |

* cited by examiner

SYSTEM FOR PROTECTING A PORTABLE COMPUTING DEVICE

BACKGROUND OF THE INVENTION

The present invention relates generally to a system for protecting a portable computing device. More specifically, the present invention relates to a system for protecting a portable computing device which allows use of the portable computing device without exposing any of the integrated components of the portable computing device to potentially harmful operational conditions.

Since the advent of personal computers, manufacturers and industrial users have continually developed faster, smaller and more versatile machines, including portable computers that are dedicated to perform a specific function such as word processing, data collection or item identification. Alternatively, portable computing devices may be all purpose computing machines capable of running a variety of types of software programs. These portable computing devices, such as personal computers, may interact with a variety of portable and stationary peripheral input/output devices such as printers, light pens, image scanners, video scanners, etc. Moreover, these computers may have an electric power cord for receiving power from a standard electric outlet, as well as a battery pack for powering the unit when an electric outlet is unavailable or is inconvenient. The portability and versatility of portable computers, in combination with the ever decreasing size and weight of these machines, has attracted a significant number of users, with the number of users expected to dramatically increase in the near term.

The design and versatility of portable computers have progressed significantly, and in addition to laptop computers, personal digital assistants (PDAs), tablet computers, and other handheld computers have become popular. Laptop computers generally include an upper housing for a display, a lower housing for a keyboard, and a pivot for pivotally attaching the upper housing to the lower housing. Such construction is often referred to as "clam shell" construction. Generally, the upper housing and display are rotated away from the keyboard when the user wishes to utilize the portable computer, and are similarly rotated toward the keyboard when the palm top or portable computer is not in use. The cost of these versatile portable computers continues to decrease as they are becoming increasingly common in all areas of business and personal life, and the manufacturers enjoy savings due to the economies of scale associated with mass production.

Alternatively, many types of portable computers are designed to fill a specific need, for example, the need for a portable computer that can withstand a rugged environment. While devices of this type offer added convenience to the end user, and are manufactured of heavier materials, these devices are generally more application specific and thus do not enjoy the economies of scale associated with mass production. Thus, these "ruggedized" or "hardened" portable computers cost significantly more than a typical portable computer. In cases wherein the computer may be dropped, exposed to high amounts of moisture, dirt, extreme temperatures, etc., a typical portable computer may be irreparably damaged. Therefore, users are forced to continue to purchase ruggedized computers at an increased cost to prevent having to frequently repair or replace their typical portable computers due to their operational conditions. Also, ruggedizing, also known as "hardening", to extend the range of operating conditions, such as temperature, vibration, and shock, that can be sustained by the device is very expensive, especially considering the testing and certifications that must be performed for government and other compliance applications.

Moreover, computer technology is one of the most rapidly developing technological fields in industry today. A top of the line portable computer is likely to be outdated as soon as within a year from its release in the marketplace, and may also be eventually unusable due to the system requirements of newer software applications. Similarly, interactive and multimedia applications, which are becoming increasingly popular, require significantly higher system performance than traditional word processing applications. Thus, users are forced to frequently replace their existing computers to maintain a high level of technological capability. With the increased cost of ruggedized portable computers as compared to typical portable computers, frequent upgrading and replacement of portable computer can be quite costly and is not desirable. In some instances, such as government specification applications, replacement might not be possible due to the length of time required for the applicable certification testing. However, the ever increasing overhaul required for typical operating systems and application software require that hardware be upgraded frequently.

In an attempt to overcome this problem, those skilled in the art have attempted to enable the use of typical portable computers in rugged environments by designing protective cases of housings which can protect the portable computer during transport, etc. Various U.S. Patents relate to this technology such as U.S. Pat. No. 6,297,236 issued to Seok, U.S. Pat. No. 5,632,373 issued to Kumar et al., and U.S. Pat. No. 5,214,574 issued to Chang. However, these protective cases still do not enable a user to operate a typical portable computer in harsh and rugged environments. In particular, the protective cases only protect the portable computer from environmental conditions while the computer is not being operated, for example, during transport. When the portable computer is being operated, the computer and its peripherals are exposed to the environment. Thus, if the portable computer is being operated in the rain, for example, the protective cover will protect the portable computer from the rain until the computer is opened and operated, at which time the computer will be unprotected.

While protective cases, membranes, and the like are utilized for other types of electronic devices while still allowing use of the device, for example, a waterproof case for a non-waterproof camera, none of the existing protective cases offer protection for a device as complex or demanding as a portable computer or allow for the use of peripherals, such as a keyboard and a display, as is preferred for successful operation of a portable computer.

SUMMARY OF INVENTION

A preferred embodiment of the invention relates to a system for protecting a portable computing device, the system comprising a device housing adapted to protectively encase the portable computing device to prevent exposure of the portable computing device to potentially harmful operational conditions, the portable computing device including at least one of a user input device and a display, a protectively hardened user input device in communication with the device housing, and a protectively hardened display in communication with the device housing, wherein the device housing allows a user of the portable computing device to operate the portable computing device via the protectively hardened user input device and the protectively hardened display.

In addition, a preferred embodiment of the invention relates to a system for protecting a communications device having at least one communications port, the system comprising a device housing adapted to protectively encase the communications device, the device housing having at least one interface corresponding to the at least one communications port of the communications device, a protectively hardened user input device in communication with the device housing, and a protectively hardened display in communication with the device housing.

The protectively hardened input device may be one of an interface, a keyboard, a mouse, a touch pad, or a joystick, for example. Accordingly, the at least one interface of the device housing may enable at least one of configuration, control, and management of the communications device or portable computing device via the protectively hardened user input device. Moreover, the device housing may further comprise a sealing element, such as a moisture seal, a debris seal, a vapor seal, a electromagnetic seal, or an insulating element, such as thermal insulation, an electromagnetic interference (EMI) shield, or a radio frequency interference (RFI) shield. The device housing may also include a shock-absorbing element to attenuate any vibrations. In additional, the device housing may be formed of a plastic material, a metal material, or any other suitable material.

Moreover, if the portable computing device or communications device includes an upper housing for housing a display, a lower housing for housing a user input device, and a hinge element for pivotally connecting the upper housing to the lower housing and enabling the portable computing device or communications device to rotate around the hinge element into an open position and a closed position, the device housing further comprising a recessed portion for protectively encasing the portable computing device or communications device when the portable computing device or communications device is in the closed position. Accordingly, the device housing may allow a user of the portable computing device or communications device to operate the portable computing device or communications device via the protectively hardened user input device and the protectively hardened display when the portable computing device or communications device is in the closed position and is protectively encased within the recessed portion of the device housing.

The portable computing device or communications device may be communicatively coupled to the device housing, using electrical, optical, electromagnetic, or other communication mechanisms. Furthermore, the protectively hardened user input device and the protectively hardened display may be mounted on the device housing. Accordingly, the device housing may allow a user of the portable computing device or communications device to operate the portable computing device or communications device via the protectively hardened user input device and the protectively hardened display without exposing the portable computing device or communications device to potentially harmful operational conditions of use.

The invention may be applied to and used in conjunction with all types of portable computing devices or communications devices. Some examples of acceptable portable computing devices include laptops, personal digital assistants, handheld computers, routers, switches, hubs, telephones, cellular and other mobile telephones, or optical communications equipment. Some examples of such communications devices include routers, hubs, or switches. Examples of optical communications equipment include optical multiplexers and de-multiplexers.

These and other features, objects and advantages of the present invention will be in part apparent to those skilled in art and in part pointed out hereinafter.

DETAILED DESCRIPTION OF THE INVENTION

Figure 1A:
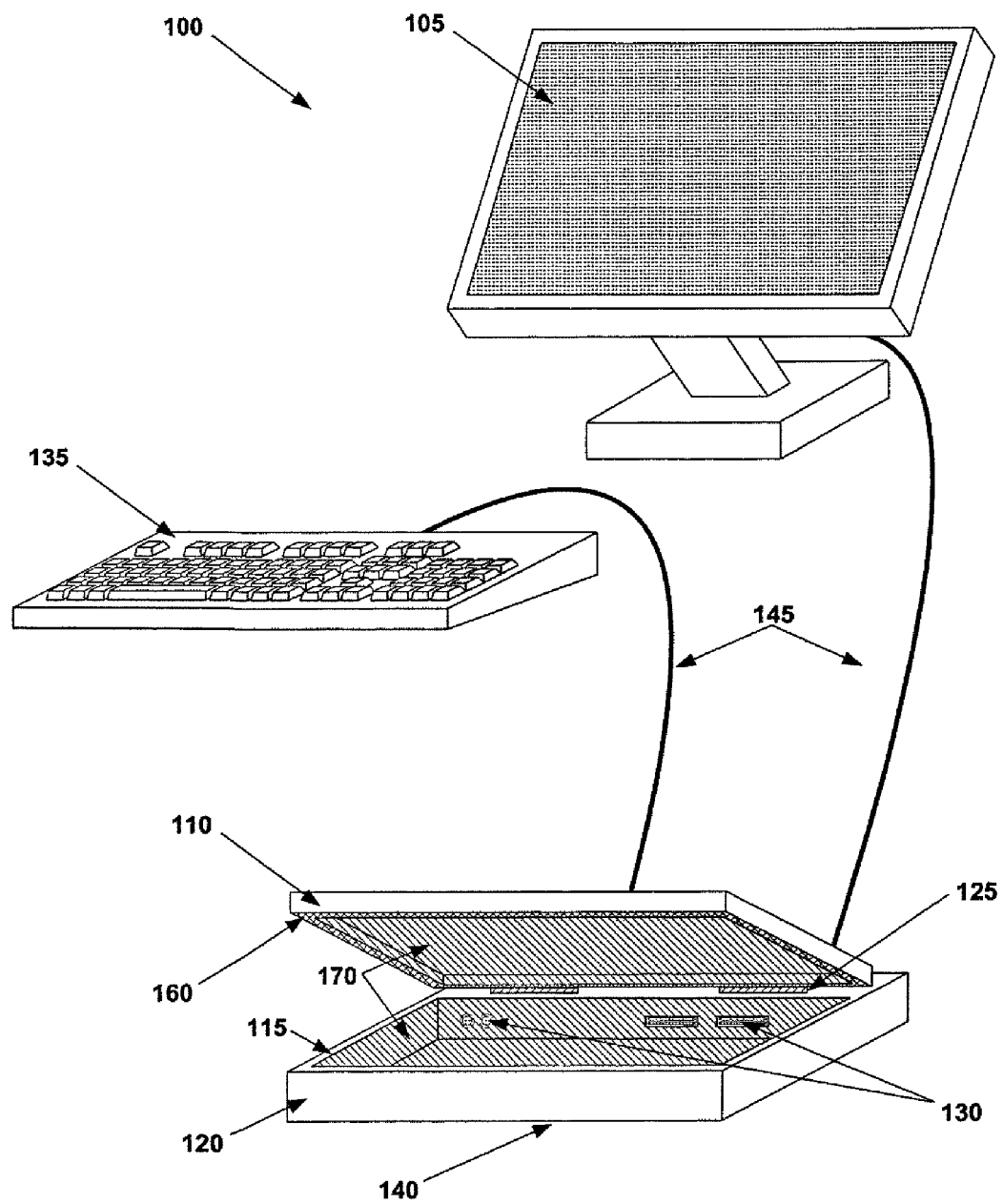
FIGS. 1A-1C are perspective views of an aspect of a preferred embodiment of the invention.

The following description is of an embodiment presently contemplated for practicing the invention. This description is not to be taken in a limiting sense but is made merely for the purpose of describing the general principles of the invention. The scope of the invention should be ascertained with reference to the issued claims. In the description of the invention that follows, like numerals or reference designators will be used to refer to like parts or elements throughout. Each system or system component described herein or shown on the enclosed figures has a three digit reference numeral. The last two digits of each reference numeral are consistent throughout for related systems or system components. Unless specifically noted to the contrary, every system or system component described herein has the same general characteristics and features of the other related systems or system components. For example, device housing 140 in FIGS. 1A-1C is related to and has the same general characteristics and features of device housing 240 in FIGS. 2A-2D, device housing 340 in FIGS. 3A-3D, and device housing 440 in FIGS. 4A-4C.

The invention relates generally to a system for protecting a portable computing device, or a communications device, the system comprising a device housing adapted to protectively encase the portable computing device or communications device to prevent exposure of the portable computing device or communications device to potentially harmful operational conditions, the portable computing device or communications device including at least one of a user input device and a display, a protectively hardened user input device in communication with the device housing, and a protectively hardened display in communication with the device housing, wherein the device housing allows a user of the portable computing device or communications device to operate the portable computing device via the protectively hardened user input device and the protectively hardened display. In this manner, the portable computing device or communications device retains functionality while exposure of the portable computing device or communications device to potentially harmful operational condition is prevented.

In addition, a preferred embodiment of the invention relates to a system for protecting a communications device having at least one communications port, the system comprising a device housing adapted to protectively encase the communications device, the device housing having at least one interface corresponding to the at least one communications port of the communications device, a protectively hardened user input device in communication with the device housing, and a protectively hardened display in communication with the device housing.

Figure 1B:
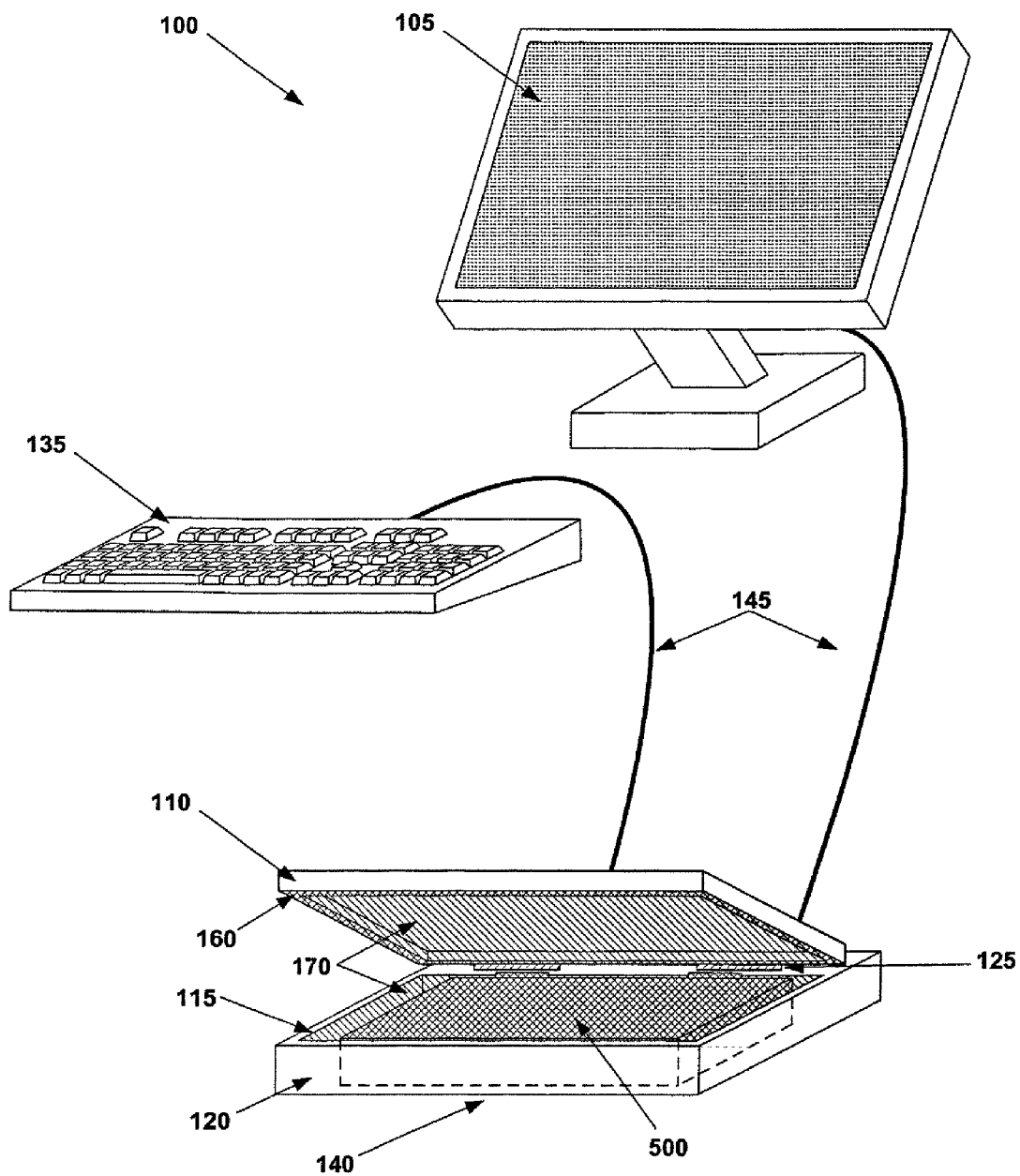
Figure 1C:
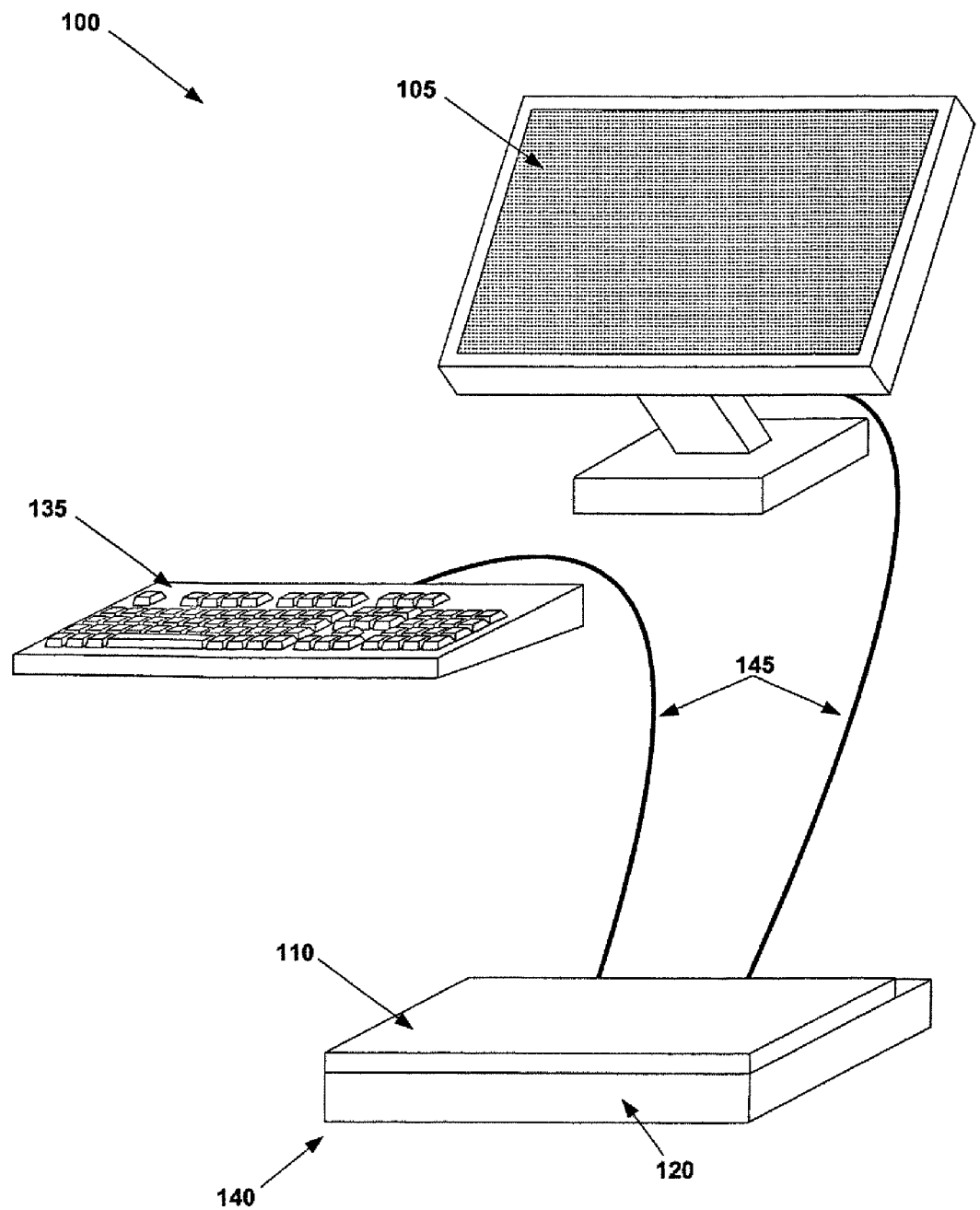
Figure 2A:
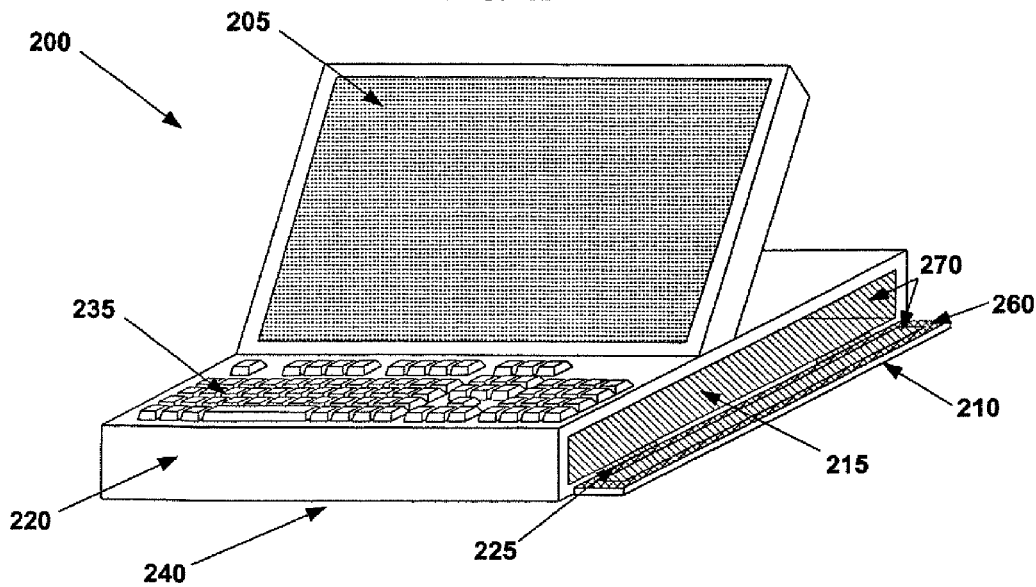
FIGS. 2A-2D are perspective views of an aspect of a preferred embodiment of the invention.
Figure 2B:
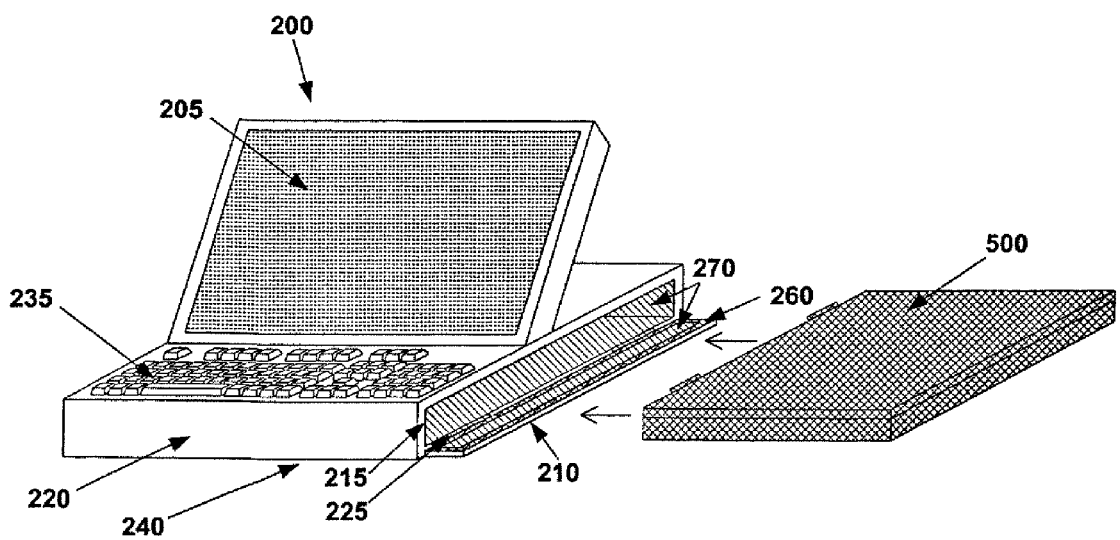
Figure 2C:
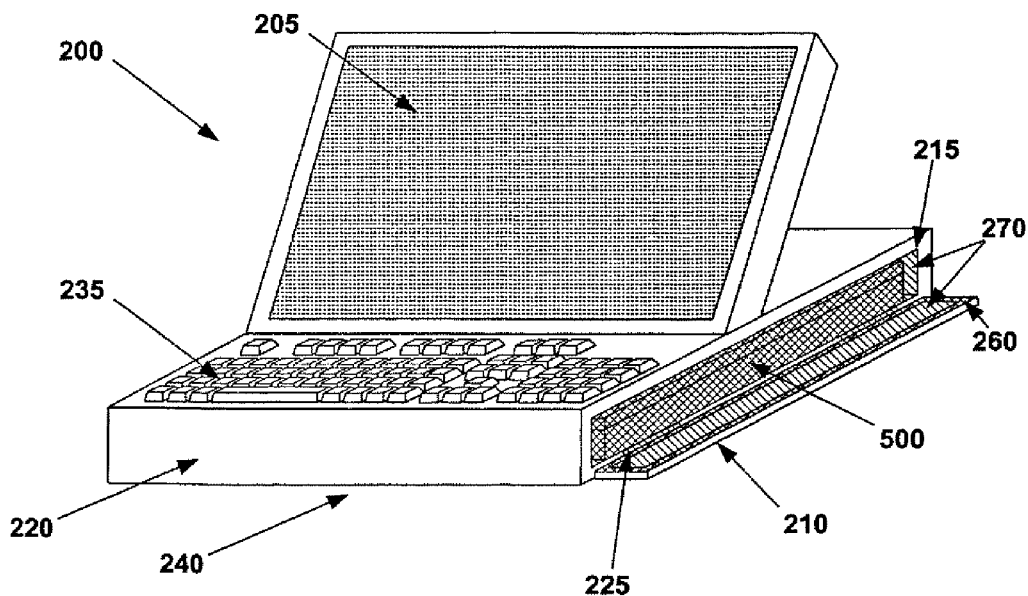
Figure 2D:
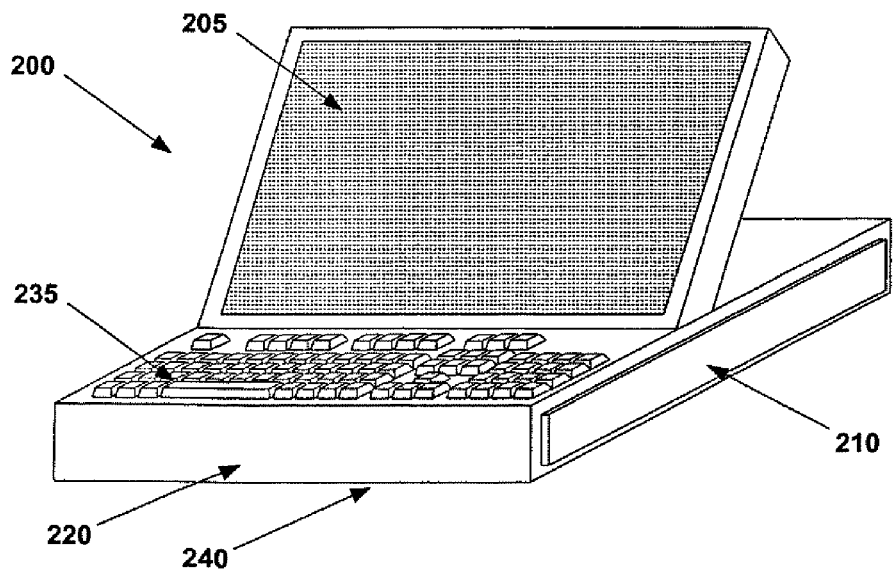
Figure 3A:
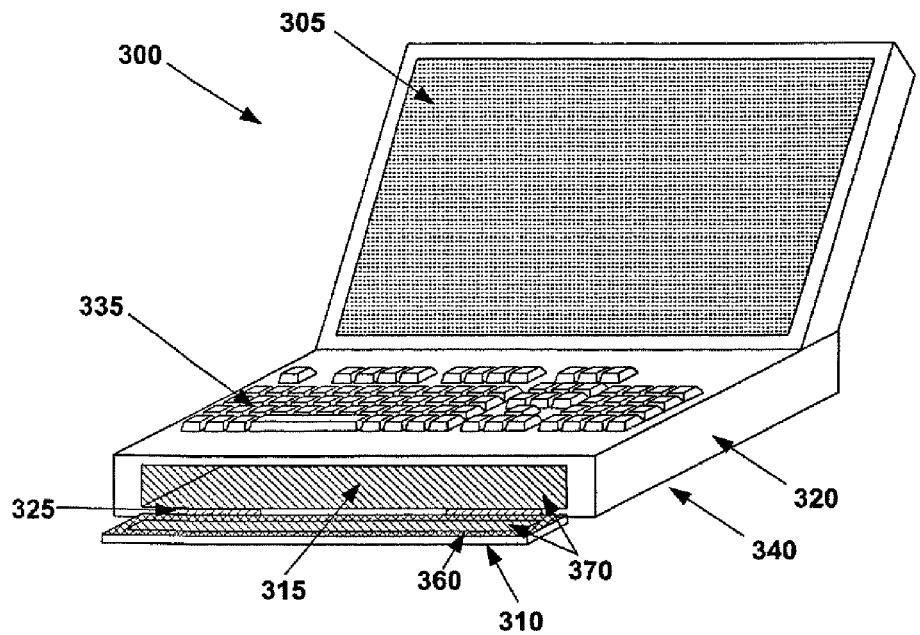
FIGS. 3A-3D are perspective views of an aspect of a preferred embodiment of the invention.
Figure 3B:
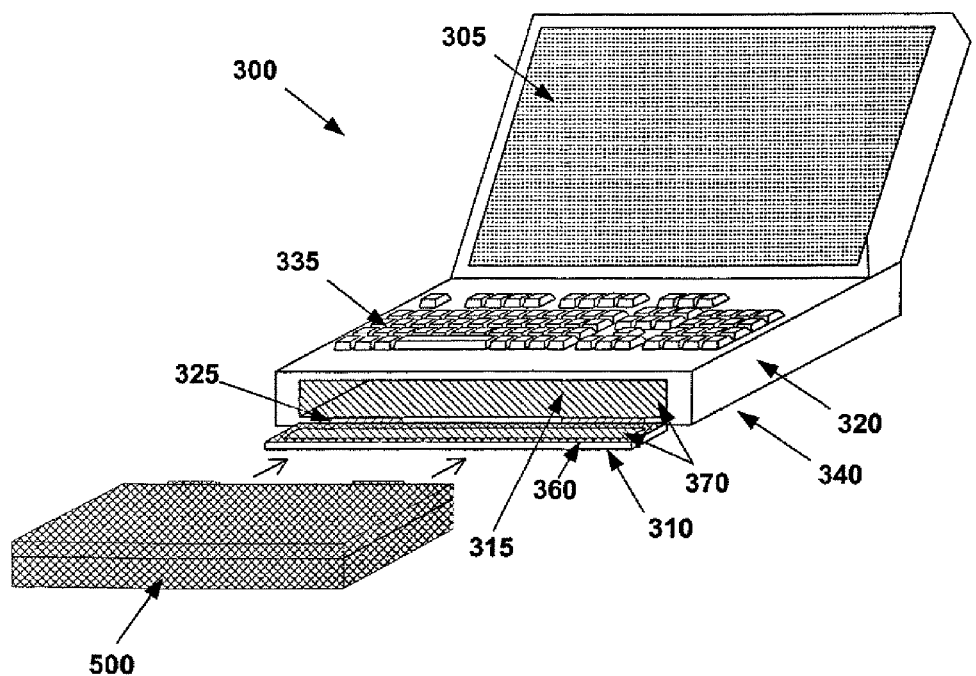
Figure 3C:
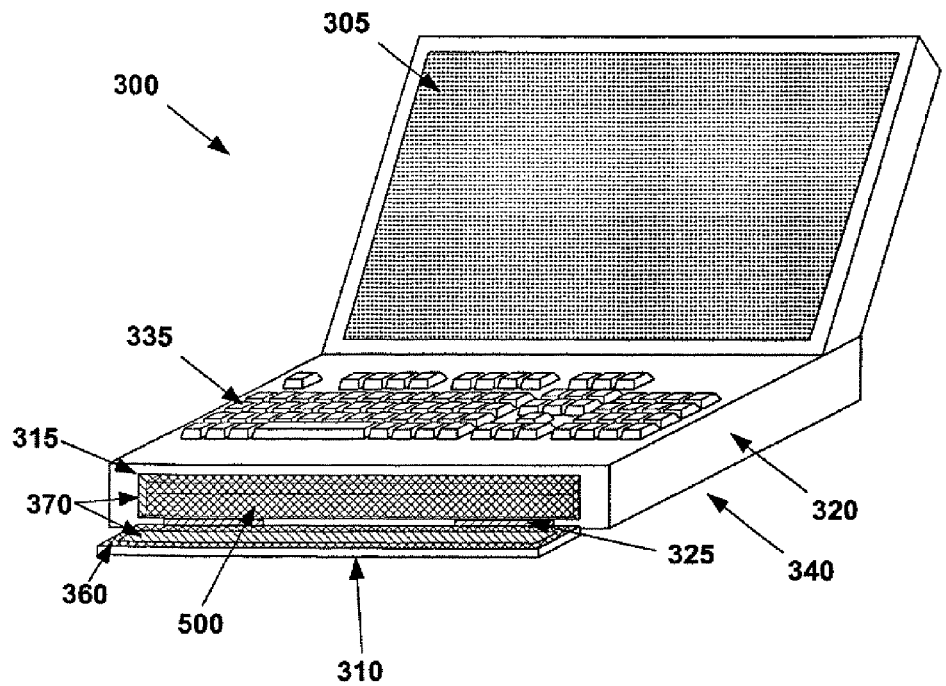
Figure 3D:
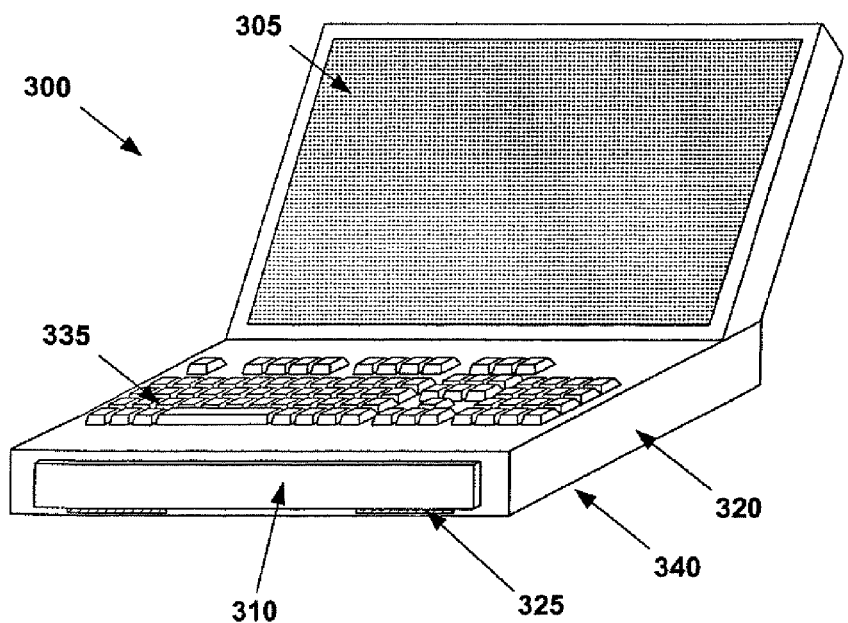

Referring now to FIGS. 1A-1C, a preferred embodiment of the invention relates to a system 100 for protecting a portable computing device 500. Portable computing device 500 may be any type of portable computing device or communications device. For example, portable computing device 500 may be a portable computer, a laptop, a personal digital assistant (PDA), a handheld computer, a router, a switch, a hub, a telephone, or a cellular telephone.

System 100 includes device housing 140, which is adapted to protectively encase portable computing device 500. Housing 140 includes a rugged outer shell 120, a recessed portion 115, and a lid portion 110. Outer shell 120 is preferably formed integrally with housing 140, as is shown in the figures. Moreover, outer shell 120 is constructed of a rugged and strong material, for example, plastic or metal, which is resistant to breakage, etc. Moreover, each of the components described herein as being "rugged" or "protectively hardened" include outer coverings similar to outer shell 120.

Recessed portion 115 may be formed in any position on housing 140, for example, on the top, as is exemplified in FIGS. 1A-1C, on the side, as is exemplified in FIGS. 2A-2D, or on the front, as is exemplified in FIG. 3A-3D. Moreover, recessed portion 115 is sized to fit portable computing device 500, regardless of what type of portable computing device is received. For example, recessed portion 115 will be relatively small if portable computing device 500 is a smaller portable computing device such as a PDA or a handheld computer. However, as is exemplified by the figures, portable computing device 500 may be a laptop computer, with recessed portion 115 being large enough to receive the laptop computer. When portable computing device 500 is a laptop computer or any type of portable computing device that includes an upper housing for housing a display, a lower housing for housing a keyboard, and a hinge element for pivotally connecting the upper housing to the lower housing and enabling the portable computing device to rotate around the hinge element into an open position and a closed position, recessed portion 115 of housing 140 may be sized to receive portable computing device 500 in the closed position. In addition, it is preferable that portable computing device 500 fit snuggly within recessed portion 115 to prevent motion of portable computing device 500 relative to housing 140 while portable computing device 500 is positioned within recessed portion 115. Thus, padding or any other suitable material may be used in recessed portion 115 to ensure a snug fit. This material can be an inexpensive custom foam designed for the particular portable computing device being used. For example, this material may generally resemble the foam liner typically found in laptop computer carrying cases. Each different model of portable computing device may have a custom liner of a size and shape appropriate to secure that particular portable computing device within the recessed portion.

In addition, when positioned within recessed portion 115, portable computing device 500 is in communication with, and electronically coupled to, housing 140 via docking elements 130. The positioning of docking elements 130 on housing 140 will vary depending on the size and type of portable computing device used. For example, when portable computing device 500 is a laptop computer, docking elements 130 will be space further apart to correspond to the larger size of a laptop computer. In the alternative, if portable computing device 500 is a PDA or a handheld computer, docking elements 130 will be closer together to correspond to the smaller size of the PDA or handheld computer. Housing 140 may include a plurality of sets of docking elements 130 such that different type of portable computing devices 500 may be used without making any significant changes to housing 140. In the alternative, housing 140 may be designed specifically to receive only one type of portable computing device, such as a laptop computer. In this case, docking elements 130 can be customized to receive that type of portable computing device.

Docking elements 130 may consist of a variety of individuals docking elements for the various outputs of portable computing device 500. For example, docking elements 130 may include elements for allowing communication for a variety of communication elements such as a telephone connection to facilitate use of a modem and an Ethernet connection to facilitate use of the network connectivity of portable computing device 500. In addition, docking elements 130 may include elements for enabling communication between portable computing device 500 and any of a variety of peripherals, for example, a mouse, a keyboard, a display, speakers, a printer, additional storage or encrypted storage and communication systems, a network such as Ethernet, an antenna for wireless communication, and an authentication key or biometric access key. Furthermore, docking elements 130 may also include connections to a power source, USB ports, firewire ports, infrared connections, and any other types of connections and ports available on portable computing device 500. Thus, docking elements 130 may include many different types of docking elements include electrical power, serial ports, printer ports, USB and firewire ports, printer ports, etc. Accordingly, portable computing device 500 can achieve its same connectivity and functionality by docking with docking elements 130 that it could achieve if used separately from housing 140. Docking elements are not limited to connectors, but may include pigtails to allow a number of different types of portable computing devices to be connected, as well as power conditioning equipment such as filters and regulators, or custom interface modules or docking stations.

When portable computing device 500 is positioned within recessed portion 115 of housing 140, rugged lid portion 110 is closed over portable computing device 500, thereby completely encasing portable computing device 500 within recessed portion 115. As is exemplified in FIGS. 1A-1C, lid portion 110 may be attached to housing 140 with a plurality of hinges 125. Hinges 125 are merely an example of how lid portion 110 may be mounted on housing 140. Other possible means of mounting lid portion 110 on housing 140 include a set of screws for attaching lid portion 110 to housing 140, sliding lid portion 110 relative to housing 140, and forming lid portion 110 integrally with housing 140 in a manner that allows portable computing device 500 to be encased with housing 140.

When lid portion 110 is closed over recessed portion 115 and portable computing device 500, a sealing element 160 is compressed between lid portion 110 and housing 140, thereby forming a seal between housing 140 and lid portion 110. Sealing element 160 can be mounted on or formed integrally with either lid portion 110 or housing 140, or may be a separate component. For example, sealing element 160 may be a gasket type element affixed to either lid portion 110 or housing 140. As exemplified in the figures, sealing element 110 is preferably affixed to lid portion 110.

The seal formed between lid portion 110 and housing 140 can consist of one or more of a moisture seal, a debris seal, and a vapor seal, for example. A moisture seal is a seal that prevents liquids, for example, water, from entering recessed portion 115 and coming into contact with portable computing device 500. The moisture seal thus prevents the portable computing device from being exposed to external moisture such as rain, chemicals, drinks, etc. A debris seal is a seal that prevents debris, for example, dirt and sand, from entering recessed portion 115 and coming into contact with portable computing device 500. The debris seal thus prevents the portable computing device from being exposed to external debris such as dust, etc. A vapor seal is a seal that prevents vapors, for example, gases, from entering recessed portion 115 and coming into contact with portable computing device 500. The vapor seal accordingly prevents the portable computing device from being exposed to external vapors such as potentially harmful gases, water vapors, etc. Thus, when portable computing device 500 is encased within housing 140, sealing element 160 can prevent damage to portable computing device 500 when portable computing device 500 is used, for example, outside during a hurricane or dust storm. Various sealing functions, such as those described above, may be accomplished by either a single sealing element 160 or by multiple sealing elements 160 used in combination. Additionally, an electromagnetic interference (EMI) shield or radio frequency interference (RFI) shield can be used to prevent the transmission of electromagnetic energy.

Housing 140 and lid portion 110 may also include one or more of insulating elements 170. Insulating elements 170, which are formed of an insulating material such as foam or the like, are preferably positioned in and around recessed portion 115 of housing 140 and lid portion 110. For example, insulating elements 170 may be positioned on the inner side of lid portion 110 facing recessed portion 115 and on the bottom and sides of recessed portion 115. Thus, when portable computing device 500 is encased within housing 140, insulating elements 170 effectively surround portable computing device 500. In the alternative, insulating elements 170 may be formed integrally within housing 140. For example, housing 140 and lid portion 110 may be constructed of a material that is naturally insulating.

Insulating elements 170 insulate portable computing device 500 from external conditions that may be harmful to portable computing device 500. For example, insulating elements 170 may provide thermal insulation to protect portable computing device 500 from extreme external temperatures, for example, extreme heat or cold. Thus, if portable computing device 500 is encased within housing 140 and is used in extremely cold conditions, for example, in the arctic, insulating elements 170 insulate portable computing device 500 and prevent portable computing device 500 from freezing. Additionally, temperature compensating devices such as solid-state heat pumps or heat-sinking (conducting) shock-absorbing foam, can be incorporated to maintain the portable computing device within its operational range.

Insulating elements 170 may also function as shock-absorbing elements. In this case, insulating elements 170 protect portable computing device 500 from external vibrations that may be harmful to portable computing device 500. For example, insulating elements 170 can absorb external vibrations that impact housing 140. Thus, if housing 140 is subjected to potentially harmful levels of vibration, for example, being dropped or being used in a vehicle in motion, insulating elements 170 protect portable computing device 500 from those vibrations. Therefore, if portable computing device 500 is encased within housing 140 and is used in a manner that would normally expose portable computing device 500 to potentially harmful shocks and vibrations, for example, in a moving vehicle, insulating elements 170 absorb those vibrations and prevent the vibrations from damaging portable computing device 500.

When portable computing device 500 is encased within housing 140, portable computing device is in communication with one or more peripherals, for example, a rugged display 105 and a rugged user input device 135. Other peripherals may include a mouse, a printer, a network, a phone jack, etc. This communication may be facilitated by cables 145. One end of cables 145 are connected to one or more peripherals. The other end of cable 145 is connected to housing 140. The end of cable 145 connected to housing 140 are in communication with portable computing device 500 via docking elements 130, as described above. Thus, cables 145 may be any type of cable adapted for use with a portable computing device such as USB cables, telephone cables, network cables, firewire cables, and serial cables. As an alternative to cables 145, housing 140 or computer 500 may have wireless capability, thereby being in communication with one or more peripherals wirelessly.

The rugged peripherals, for example, rugged display 105 and rugged user input device 135, are designed for use in harsh and potentially harmful environments. As with housing 140, each of the peripherals preferably includes an outer shell similar to outer shell 120 of housing 140. In addition, each of the rugged peripherals should be resistant to external conditions of concern. For example, if system 100 is used in a wet environment, for example, during a hurricane, and sealing element 160 includes a moisture seal, it is preferable for each of the rugged peripherals to also be resistant to moisture. Accordingly, the rugged user input device 135 would be impervious to moisture and would be fully functional in a wet environment.

Therefore, when portable computing device 500 is encased within housing 140 as described above, portable computing device 500 may be operated using rugged peripherals in communication with portable computing device 145, such as rugged user input device 135 and rugged display 105. Accordingly, portable computing device 500 may be used via the rugged peripherals in unfavorable and potentially damaging conditions without exposing portable computing device 500 to those conditions.

The preferred embodiments of the invention shown in FIGS. 2A-2D, 3A-3D, and 4A-4C include slight variations from the preferred embodiment shown in FIGS. 1A-1C in two ways. First, as is described above, the recessed portion of the housing may be located in different positions on the housing. Second, the rugged peripherals, such as a rugged user input device and a rugged display, may be mounted onto the housing.

FIGS. 2A-2D exemplify a system 200 for protecting portable computing device 500 wherein system 200 includes a device housing 240 adapted to protectively encase portable computing device 500 to prevent exposure of portable computing device 500 to potentially harmful operational conditions. As is described above, portable computing device 500 may include a user input device and a display, for example, a laptop computer. However, portable computing device 500 may be any type of portable computing device, for example, a PDA or a handheld computer.

Housing 240 includes a rugged outer shell 220, a recessed portion 215, and a lid portion 210. As is shown in the figures, recessed portion 215 may be formed on the side of housing 240. Thus, portable computing device 500 can be inserted into recessed portion 215 from the side of housing 140, and docked with housing 240 as described above with reference to docking elements 130 shown in FIGS. 1A-1C. Thus, portable computing device 500 is in communication with docking elements of housing 240.

When portable computing device 500 is positioned within recessed portion 215 of housing 240, rugged lid portion 210 is closed over portable computing device 500, thereby completely encasing portable computing device 500 within recessed portion 215. Lid portion 210 may be attached to housing 240 with a plurality of hinges 225 or by any other suitable means.

When lid portion 210 is closed over recessed portion 215 and portable computing device 500, a sealing element 260 is compressed between lid portion 210 and housing 240, thereby forming a seal between housing 240 and lid portion 210. As described above, the seal formed between lid portion 210 and housing 240 can consist of one or more of a moisture seal, a debris seal, and a vapor seal, for example. Thus, when portable computing device 500 is encased within housing 240, sealing element 260 can prevent damage to portable computing device 500 when portable computing device 500 is used, for example, outside during a hurricane or dust storm.

Housing 240 and lid portion 210 may also include one or more of insulating elements 270. Insulating elements 270, which are formed of an insulating material such as foam or the like, are preferably positioned in and around recessed portion 215 of housing 240 and lid portion 210. For example, insulating elements 270 may be positioned on the inner side of lid portion 210 facing recessed portion 215 and on the top, bottom, and sides of recessed portion 215. Thus, when portable computing device 500 is encased within housing 240, insulating elements 270 effectively surround portable computing device 500. In the alternative, insulating elements 270 may be formed integrally within housing 240. For example, housing 240 and lid portion 210 may be constructed of a material that is naturally insulating.

Insulating elements 270 insulate portable computing device 500 from external conditions that may be harmful to portable computing device 500. For example, insulating elements 270 may provide thermal insulation to protect portable computing device 500 from extreme external temperatures, for example, extreme heat or cold. Thus, if portable computing device 500 is encased within housing 240 and is used in extremely cold conditions, for example, in the arctic, insulating elements 270 insulate portable computing device 500 and prevent portable computing device 500 from freezing.

Insulating elements 270 may also function as shock-absorbing elements. In this case, insulating elements 270 protect portable computing device 500 from external vibrations that may be harmful to portable computing device 500. For example, insulating elements 270 can absorb external vibrations that impact housing 240. Thus, if housing 240 is subjected to potentially harmful levels of vibration, for example, being dropped or being used in a vehicle in motion, insulating elements 270 protect portable computing device 500 from those vibrations. Therefore, if portable computing device 500 is encased within housing 240 and is used in a manner that would normally expose portable computing device 500 to potentially harmful shocks and vibrations, for example, in a moving vehicle, insulating elements 270 absorb those vibrations and prevent the vibrations from damaging portable computing device 500.

When portable computing device 500 is encased within housing 240, portable computing device is in communication with one or more peripherals, for example, a rugged display 205 and a rugged user input device 235. Other peripherals may include a mouse, a printer, a network, a phone jack, etc. As is shown in FIGS. 2A-2D, these rugged peripherals may be mounted directly on, or be formed integrally with, housing 240. For example, rugged user input device 235 and rugged display 205 may be mounted directly on housing 240.

The rugged peripherals, for example, rugged display 205 and rugged user input device 235, are designed for use in harsh and potentially harmful environments. As with housing 240, each of the peripherals preferably includes an outer shell similar to outer shell 220 of housing 240. In addition, each of the rugged peripherals should be resistant to external conditions of concern. For example, if system 200 is used in a wet environment, for example, during a hurricane, and sealing element 260 includes a moisture seal, it is preferable for each of the rugged peripherals to also be resistant to moisture.

Therefore, when portable computing device 500 is encased within housing 240 as described above, portable computing device 500 may be operated using rugged peripherals mounted on or formed integrally with housing 240, such as rugged user input device 235 and rugged display 205. Accordingly, portable computing device 500 may be used via the rugged peripherals in unfavorable and potentially damaging conditions without exposing portable computing device 500 to those conditions.

FIGS. 3A-3D exemplify a system 300 similar to system 200 shown in FIGS. 2A-2D with the exception that a recessed portion 315 is positioned on the front of housing 340. Thus, system 300 is a system for protecting portable computing device 500 wherein system 300 includes a device housing 340 adapted to protectively encase portable computing device 500 to prevent exposure of portable computing device 500 to potentially harmful operational conditions. Housing 340 includes a rugged outer shell 320, a recessed portion 315, and a lid portion 310. As is shown in the figures, recessed portion 315 may be formed on the front of housing 340. Thus, portable computing device 500 can be inserted into recessed portion 315 from the front of housing 340, and docked with housing 340 as described above with reference to docking elements 130 shown in FIGS. 1A-1C.

When portable computing device 500 is positioned within recessed portion 315 of housing 340, rugged lid portion 310 may be closed over portable computing device 500, thereby completely encasing portable computing device 500 within recessed portion 315. Lid portion 310 may be attached to housing 340 with a plurality of hinges 325 or by any other suitable means.

When lid portion 310 is closed over recessed portion 315 and portable computing device 500, a sealing element 360 is compressed between lid portion 310 and housing 340, thereby forming a seal between housing 340 and lid portion 310. As described above, the seal formed between lid portion 310 and housing 340 can consist of one or more of a moisture seal, a debris seal, and a vapor seal, for example. Thus, when portable computing device 500 is encased within housing 340, sealing element 360 can prevent damage to portable computing device 500 when portable computing device 500 is used, for example, outside during a hurricane or dust storm.

Housing 340 and lid portion 310 may also include one or more of insulating elements 370. Insulating elements 370, which are formed of an insulating material such as foam or the like, are preferably positioned in and around recessed portion 315 of housing 340 and lid portion 310. For example, insulating elements 370 may be positioned on the inner side of lid portion 310 facing recessed portion 315 and on the top, bottom, and sides of recessed portion 315. Thus, when portable computing device 500 is encased within housing 340, insulating elements 370 effectively surround portable computing device 500. In the alternative, insulating elements 370 may be formed integrally within housing 340. For example, housing 340 and lid portion 310 may be constructed of a material that is naturally insulating.

Insulating elements 370 insulate portable computing device 500 from external conditions that may be harmful to portable computing device 500. For example, insulating elements 370 may provide thermal insulation to protect portable computing device 500 from extreme external temperatures, for example, extreme heat or cold. Thus, if portable computing device 500 is encased within housing 340 and is used in extremely cold conditions, for example, in the arctic, insulating elements 370 insulate portable computing device 500 and prevent portable computing device 500 from freezing.

Insulating elements 370 may also function as shock-absorbing elements. In this case, insulating elements 370 protect portable computing device 500 from external vibrations that may be harmful to portable computing device 500. For example, insulating elements 370 can absorb external vibrations that impact housing 340. Thus, if housing 340 is subjected to potentially harmful levels of vibration, for example, being dropped or being used in a vehicle in motion, insulating elements 370 protect portable computing device 500 from those vibrations. Therefore, if portable computing device 500 is encased within housing 340 and is used in a manner that would normally expose portable computing device 500 to potentially harmful shocks and vibrations, for example, in a moving vehicle, insulating elements 370 absorb those vibrations and prevent the vibrations from damaging portable computing device 500.

When portable computing device 500 is encased within housing 340, portable computing device is in communication with one or more peripherals, for example, a rugged display 305 and a rugged user input device 335. Other peripherals may include a mouse, a printer, a network, a phone jack, etc. As is shown in FIGS. 3A-3D, these rugged peripherals may be mounted directly on, or be formed integrally with, housing 340. For example, rugged user input device 335 and rugged display 305 may be mounted directly on housing 340.

The rugged peripherals, for example, rugged display 305 and rugged user input device 335, are designed for use in harsh and potentially harmful environments. As with housing 340, each of the peripherals preferably includes an outer shell similar to outer shell 320 of housing 340. In addition, each of the rugged peripherals should be resistant to external conditions of concern. For example, if system 300 is used in a wet environment, for example, during a hurricane, and sealing element 360 includes a moisture seal, it is preferable for each of the rugged peripherals to also be resistant to moisture.

Therefore, when portable computing device 500 is encased within housing 340 as described above, portable computing device 500 may be operated using rugged peripherals mounted on or formed integrally with housing 340, such as rugged user input device 335 and rugged display 305. Accordingly, portable computing device 500 may be used via the rugged peripherals in unfavorable and potentially damaging conditions without exposing portable computing device 500 to those conditions.

Figure 4A:
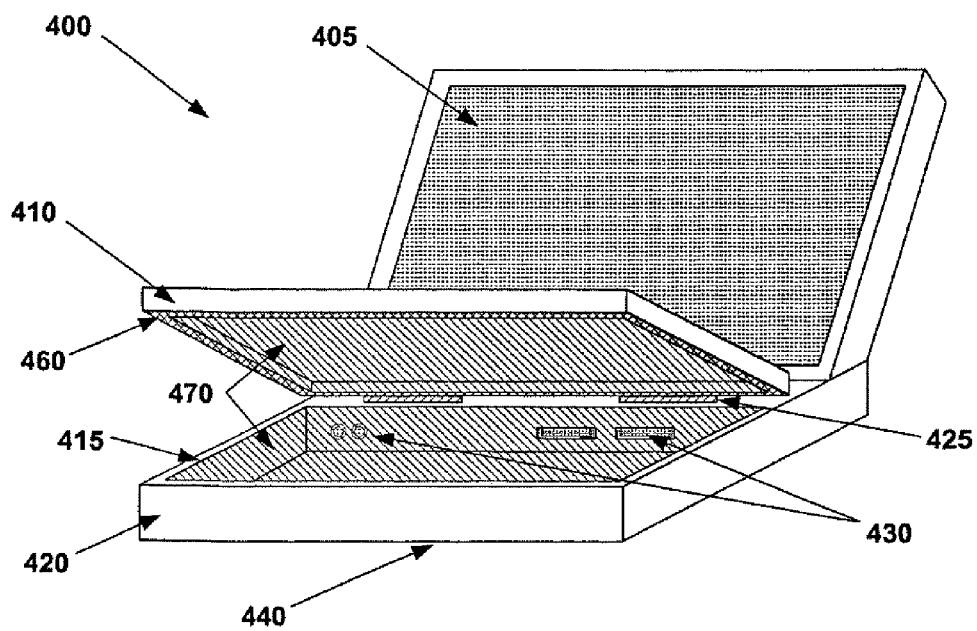
FIGS. 4A-4C are perspective views of an aspect of a preferred embodiment of the invention.
Figure 4B:
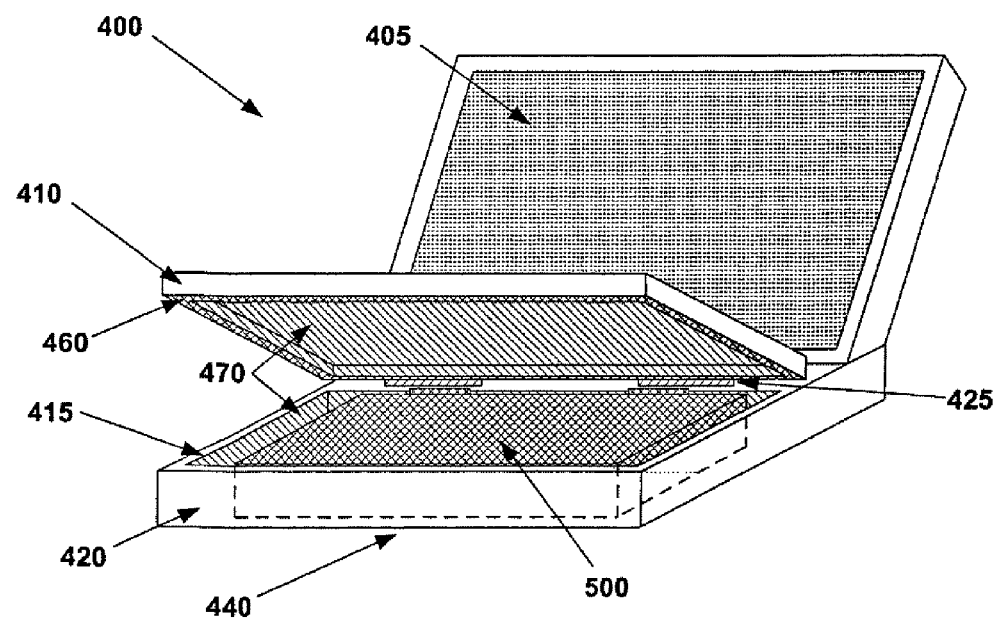
Figure 4C:
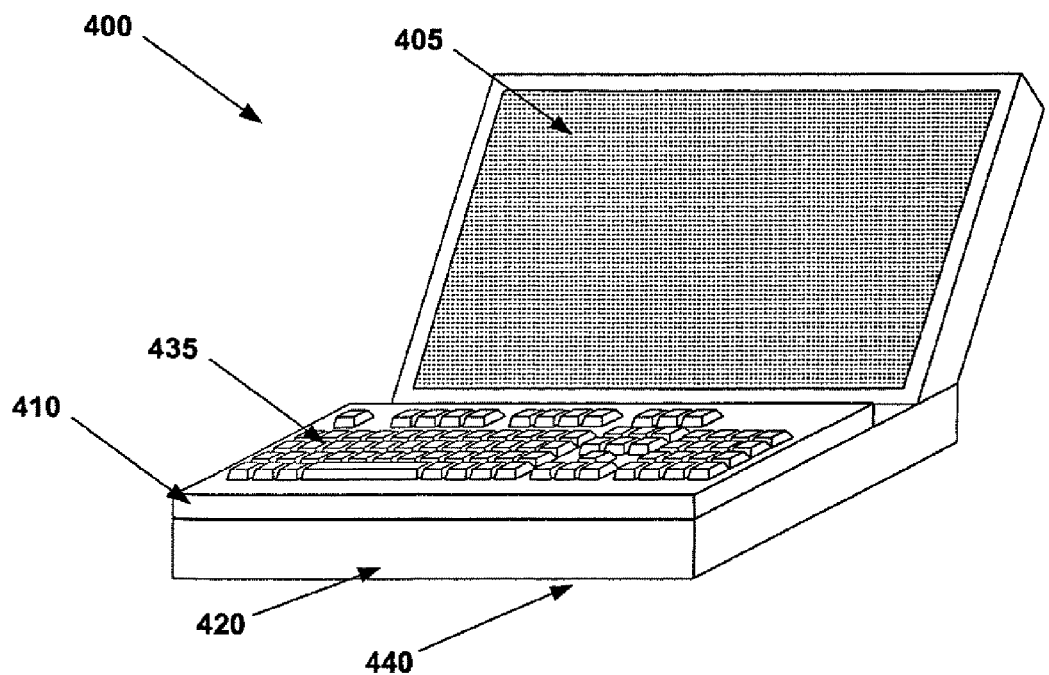

FIGS. 4A-4C also exemplify a system 400 similar to system 200 shown in FIGS. 2A-2D with the exception that a recessed portion 415 is positioned on the top of housing 440. Thus, system 400 is a system for protecting portable computing device 500 wherein system 400 includes a device housing 440 adapted to protectively encase portable computing device 500 to prevent exposure of portable computing device 500 to potentially harmful operational conditions. Housing 440 includes a rugged outer shell 420, a recessed portion 415, and a lid portion 410. As is shown in the figures, recessed portion 415 may be formed on the front of housing 440. Thus, portable computing device 500 can be inserted into recessed portion 415 from the front of housing 440, and docked with docking elements 430 as described above with reference to docking elements 130 shown in FIGS. 1A-1C.

When portable computing device 500 is positioned within recessed portion 415 of housing 440, rugged lid portion 410 may be closed over portable computing device 500, thereby completely encasing portable computing device 500 within recessed portion 415. Lid portion 410 may be attached to housing 440 with a plurality of hinges 425 or by any other suitable means.

When lid portion 410 is closed over recessed portion 415 and portable computing device 500, a sealing element 460 is compressed between lid portion 410 and housing 440, thereby forming a seal between housing 440 and lid portion 410. As described above, the seal formed between lid portion 410 and housing 440 can consist of one or more of a moisture seal, a debris seal, and a vapor seal, for example. Thus, when portable computing device 500 is encased within housing 440, sealing element 460 can prevent damage to portable computing device 500 when portable computing device 500 is used, for example, outside during a hurricane or dust storm.

Housing 440 and lid portion 410 may also include one or more of insulating elements 470. Insulating elements 470, which are formed of an insulating material such as foam or the like, are preferably positioned in and around recessed portion 415 of housing 440 and lid portion 410. For example, insulating elements 470 may be positioned on the inner side of lid portion 410 facing recessed portion 415 and on the bottom and sides of recessed portion 415. Thus, when portable computing device 500 is encased within housing 440, insulating elements 470 effectively surround portable computing device 500. In the alternative, insulating elements 470 may be formed integrally within housing 440. For example, housing 440 and lid portion 410 may be constructed of a material that is naturally insulating.

Insulating elements 470 insulate portable computing device 500 from external conditions that may be harmful to portable computing device 500. For example, insulating elements 470 may provide thermal insulation to protect portable computing device 500 from extreme external temperatures, for example, extreme heat or cold. Thus, if portable computing device 500 is encased within housing 440 and is used in extremely cold conditions, for example, in the arctic, insulating elements 470 insulate portable computing device 500 and prevent portable computing device 500 from freezing.

Insulating elements 470 may also function as shock-absorbing elements. In this case, insulating elements 470 protect portable computing device 500 from external vibrations that may be harmful to portable computing device 500. For example, insulating elements 470 can absorb external vibrations that impact housing 440. Thus, if housing 440 is subjected to potentially harmful levels of vibration, for example, being dropped or being used in a vehicle in motion, insulating elements 470 protect portable computing device 500 from those vibrations. Therefore, if portable computing device 500 is encased within housing 440 and is used in a manner that would normally expose portable computing device 500 to potentially harmful shocks and vibrations, for example, in a moving vehicle, insulating elements 470 absorb those vibrations and prevent the vibrations from damaging portable computing device 500.

When portable computing device 500 is encased within housing 440, portable computing device is in communication with one or more peripherals, for example, a rugged display 405 and a rugged user input device 435. Other peripherals may include a mouse, a printer, a network, a phone jack, etc. As is shown in FIGS. 4A-4D, these rugged peripherals may be mounted directly on, or be formed integrally with, housing 440 or lid portion 410. For example, rugged display 405 may be mounted directly on, or be formed integrally with, housing 440 and rugged user input device 435 may be mounted directly on, of formed integrally with, lid portion 410.

The rugged peripherals, for example, rugged display 405 and rugged user input device 435, are designed for use in harsh and potentially harmful environments. As with housing 440, each of the peripherals preferably includes an outer shell similar to outer shell 420 of housing 440. In addition, each of the rugged peripherals should be resistant to external conditions of concern. For example, if system 400 is used in a wet environment, for example, during a hurricane, and sealing element 460 includes a moisture seal, it is preferable for each of the rugged peripherals to also be resistant to moisture.

Therefore, when portable computing device 500 is encased within housing 440 as described above, portable computing device 500 may be operated using rugged peripherals mounted on or formed integrally with housing 440, such as rugged user input device 435 and rugged display 405. Accordingly, portable computing device 500 may be used via the rugged peripherals in unfavorable and potentially damaging conditions without exposing portable computing device 500 to those conditions.

As is described above and shown in the enclosed figures, the invention relates to a system for protecting a portable computing device wherein the system comprises a device housing adapted to protectively encase a portable computing device, a protectively hardened user input device mounted on, or in communication with, the device housing, and a protectively hardened display mounted on, or in communication with, the device housing. When the portable computing device is encased within the device housing, a user of the portable computing device can operate the portable computing device via the protectively hardened user input device and the protectively hardened display, thereby allowing and enabling use of the portable computing device while preventing exposure of the portable computing device to potentially harmful operational conditions. Moreover, the housing may also encase a portable computing device in the closed position while still enabling a user of the portable computing device to operate the portable computing device via the protectively hardened user input device and the protectively hardened display.

In addition, the device housing may further comprise one or more of a sealing element, an insulating element, and a shock-absorbing element. Furthermore, the device housing may be formed of many different types of materials including, but not limited to, plastic materials or metal materials.

The invention may be applied to and used in conjunction with all types of portable computing devices. Some examples of acceptable portable computing devices include laptop computers, personal digital assistants (PDA's), and handheld computers.

Thus, the invention allows a user to pay only once for the high cost of an environmentally rugged system that uses a potentially inexpensive portable computing device and then simply replace the portable computing device with another potentially inexpensive unit as necessary upon the original unit's failure or obsolescence. Also, the invention permits government and other certifications for harsh environments to be accomplished only once, for the case itself, without the need to recertify for each computing device. This can yield tremendous time and cost savings. For the first time, the invention permits the most up to date devices to be used in harsh environments, such as the battlefield. The invention further allows a user to simply use his own portable computing device preloaded with software and data, or an encrypted computer system, with the environmentally rugged system of the invention.

It will thus be seen that the objects set forth above, among those made apparent from the preceding description, are efficiently attained and, since certain changes may be made, in carrying out the above processes, in a described instrument, and in the construction set forth, without departing from the spirit and scope of the invention, it is intended that all matter contained in the above description shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between.

The claimed invention is:

1. A housing for protectively encasing a portable computing device to prevent exposure of the portable computing device to potentially harmful operational conditions, the portable computing device including a user input portion adapted to receive user inputs and a display portion adapted to display content, the housing comprising:
   a protectively hardened user input portion adapted to protect the user input portion of the portable computing device; and
   a protectively hardened display portion adapted to protect the display portion of the portable computing device,
   wherein the housing allows a user of the portable computing device to operate the portable computing device via the protectively hardened user input portion and the protectively hardened display portion.

2. The housing of claim 1, wherein the portable computing device is a personal digital assistant.

3. The housing of claim 1, wherein the portable computing device is a handheld computer.

4. The housing of claim 1, wherein the portable computing device is a telephone.

5. The housing of claim 1, wherein the portable computing device is a mobile device.

6. The housing of claim 1, wherein the portable computing device is a portable music player.

7. The housing of claim 1, wherein the housing allows a user of the portable computing device to operate the portable computing device via the protectively hardened user input portion and the protectively hardened display portion without exposing the portable computing device to potentially harmful operational conditions of use.

8. The housing of claim 1, wherein the housing further comprises a sealing element.

9. The housing of claim 8, wherein the sealing element comprises a moisture seal.

10. The housing of claim 9, wherein the sealing element comprises a debris seal.

11. The housing of claim 9, wherein the sealing element comprises a vapor seal.

12. The housing of claim 9, wherein the sealing element comprises a electromagnetic seal.

13. The housing of claim 1, further comprising an insulating element.

14. The housing of claim 13, wherein the insulating element comprises thermal insulation.

15. The housing of claim 13, wherein the insulating element comprises an electromagnetic interference shield.

16. The housing of claim 13, wherein the insulating element comprises a radio frequency interference shield.

17. The housing of claim 1, further comprising a shock-absorbing element.

18. The housing of claim 1, wherein at least a portion of the housing is formed of a plastic material.

19. The housing of claim 1, wherein at least a portion of the housing is formed of a metal material.

20. The housing of claim 1, wherein at least a portion of the housing is formed of Kevlar or carbon fiber.

21. The housing of claim 1, wherein the protectively hardened user input portion and the protectively hardened display portion are combined into a single protectively hardened portion.

22. The housing of claim 1, wherein at least one of the protectively hardened user input portion and the protectively hardened display portion is removable.

* * * * *